United States Patent
Attensperger et al.

(10) Patent No.: US 10,214,216 B2
(45) Date of Patent: Feb. 26, 2019

(54) METHOD AND SYSTEM FOR OPERATING A MOTOR VEHICLE

(71) Applicant: AUDI AG, Ingolstadt (DE)

(72) Inventors: Tobias Attensperger, München (DE); Moritz Reiff, Freising (DE); Martin Sorge, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/546,461

(22) PCT Filed: Jan. 25, 2016

(86) PCT No.: PCT/EP2016/051439
§ 371 (c)(1),
(2) Date: Jul. 26, 2017

(87) PCT Pub. No.: WO2016/120201
PCT Pub. Date: Aug. 4, 2016

(65) Prior Publication Data
US 2017/0361843 A1  Dec. 21, 2017

(30) Foreign Application Priority Data
Jan. 31, 2015  (DE) .................. 10 2015 001 248

(51) Int. Cl.
*B60W 30/14* (2006.01)
*B60W 30/188* (2012.01)
(Continued)

(52) U.S. Cl.
CPC ...... *B60W 30/188* (2013.01); *B60W 50/0097* (2013.01); *B60W 50/085* (2013.01);
(Continued)

(58) Field of Classification Search
CPC .... B60W 30/188; B60W 50/10; B60W 50/12; B60W 50/14; B60W 50/085;
(Continued)

(56) References Cited

U.S. PATENT DOCUMENTS 9,297,455 B2 *  3/2016  Li ........................ F16H 61/00
9,689,681 B2 *  6/2017  Napolitano ............ G01C 21/00
(Continued)

FOREIGN PATENT DOCUMENTS

DE  10306093 A1  9/2003
DE  10302504 A1  9/2004
(Continued)

OTHER PUBLICATIONS

Notification of Transmittal of Translation of the International Preliminary Report on Patentability dated Aug. 10, 2017, in connection with corresponding international application No. PCT/EP2016/051439 (8 pgs.).

(Continued)

*Primary Examiner* — David J Hlavka
(74) *Attorney, Agent, or Firm* — Maier & Maier, PLLC

(57) ABSTRACT

A method for operating a motor vehicle by detecting a destination input by a motor vehicle occupant; and determining which residual range of the motor vehicle will be indicated at the destination. If the determined residual range is less than a predetermined threshold value, the motor vehicle is operated in a consumption optimizing mode during which the motor vehicle is operated to carry out automatic measures for reducing the consumption of the motor vehicle until reaching the destination.

9 Claims, 1 Drawing Sheet

(51) Int. Cl.
*B60W 50/00* (2006.01)
*B60W 50/08* (2012.01)
*B60W 50/16* (2012.01)
*B60W 50/10* (2012.01)
*B60W 50/12* (2012.01)
*B60W 50/14* (2012.01)

(52) U.S. Cl.
CPC .......... *B60W 50/087* (2013.01); *B60W 50/10* (2013.01); *B60W 50/12* (2013.01); *B60W 50/14* (2013.01); *B60W 50/16* (2013.01); B60W 30/14 (2013.01); B60W 2050/143 (2013.01); B60W 2050/146 (2013.01); B60W 2540/28 (2013.01); B60W 2540/30 (2013.01); B60W 2550/12 (2013.01); B60W 2550/141 (2013.01); B60W 2550/142 (2013.01); B60W 2550/146 (2013.01); B60W 2550/147 (2013.01); B60W 2550/22 (2013.01); B60W 2550/402 (2013.01); B60W 2710/021 (2013.01); B60W 2710/0666 (2013.01); B60W 2710/083 (2013.01); B60W 2710/086 (2013.01); B60W 2710/305 (2013.01); B60W 2720/10 (2013.01); Y02T 10/52 (2013.01); Y02T 10/84 (2013.01)

(58) Field of Classification Search
CPC .............. B60W 50/087; B60W 50/16; B60W 50/0097; B60W 2710/0666; B60W 30/14; B60W 2710/083; B60W 2550/402; B60W 2550/147; B60W 2550/146; B60W 2710/021; B60W 2550/141; B60W 2550/12; B60W 2050/146; B60W 2050/143; B60W 2550/22; B60W 2710/086; B60W 2720/10; B60W 2710/305; B60W 2550/142; B60W 2540/28; B60W 2540/30; Y02T 10/84; Y02T 10/52

See application file for complete search history.

(56) References Cited

U.S. PATENT DOCUMENTS

2004/0068359 A1  4/2004  Neiss et al.
2017/0240174 A1* 8/2017  Sawada .................... B60K 6/48

FOREIGN PATENT DOCUMENTS

| DE | 102004047856 A1 | 4/2006 |
| DE | 102005037553 A1 | 2/2007 |
| DE | 102010010620 A1 | 1/2011 |
| DE | 102011116184 A1 | 4/2013 |
| DE | 102012018290 A1 | 3/2014 |
| DE | 102012023632 A1 | 6/2014 |
| DE | 102013211871 A1 | 12/2014 |

OTHER PUBLICATIONS

Examination Report dated Oct. 8, 2015 of corresponding German application No. 102015001248.7; 8 pgs.
International Search Report dated May 23, 2016 of corresponding International application No. PCT/EP2016/051439; 15 pgs.

* cited by examiner

METHOD AND SYSTEM FOR OPERATING A MOTOR VEHICLE

FIELD

The invention relates to a method and a system for operating a motor vehicle as well as a motor vehicle with such a system.

BACKGROUND

Depending on the level of fuel in the fuel tank and/or depending on the battery charging status of a motor vehicle, a driver may not be able to reach a desired destination under some circumstance. In order to still be able to reach this destination, it is necessary to start at a gas station and/or a charging column. It is difficult for the driver to predict with what kind of driving and under what other additional conditions one can reach the destination safely without refueling and/or without recharging. In particular when purely electric vehicles are used, one disadvantage is that quick charging columns are not widely available. This can result in significant delays due to the required detours or due to prolonged charging times.

DE 10 2005 037 553 A1 describes a method for driving a hybrid vehicle. The method for operating the electric motor of the hybrid vehicle is selected depending on the travel route, the relevant dates and it also takes into account a charging state of the energy storage device of the hybrid motor vehicle. An operating strategy for operating the hybrid vehicle is thus in this case determined by the geographical travel destination and/or by the destination parameters of the operating strategy, wherein one of these travel routes is selected depending upon the availability of alternative travel routes.

DE 103 06 093 A1 describes a method for determining an optimal motor vehicle consumption and a warning system for warning a driver when sufficient fuel is not available to reach the desired destination. The consumption of fuel is calculated and the driver is warned when sufficient fuel may not be available to reach a fuel station on the way back from the desired destination.

DE 10 2004 047 856 A1 discloses an apparatus for controlling the operation of a motor vehicle provided with a device for detecting ambient and motor vehicle operating parameters, which are processed in a computer unit and displayed on a display device. In order to improve the influence exerted by the driver, an input device is provided through which some of the operating parameters of the motor vehicle can be manipulated during the operation of the motor vehicle.

DE 10 2012 023 632 A1 discloses a method for actively influencing the range of a motor vehicle. A preset travel destination and a first system configuration of the motor vehicle is determined and the remaining range of the motor vehicle and the travel destination are indicated. If this remaining range falls below a predetermined value, the motor vehicle is placed instead into a second system configuration, which results in a reduced energy consumption, for example so that the performance of an air conditioning system and of a driver of the motor vehicle is automatically reduced to a predetermined value. At the same time, an automatic change can take place in an expert system mode so that the driver receives a notice about the predetermined reduction of the performance of the air conditioning and of the drive. For the second system configuration it is then determined which residual range is indicated for the motor vehicle at the travel destination. In the case that the predicted residual range is sufficient, the user can individually adjust and control the operating system and the air conditioning system. DE 103 02 504 A1 discloses a method for determining the residual range of an electric motor vehicle. The range of the of the electric vehicle is determined while taking into account information about the vehicle, the route being driven and information relating to the environment, as well as information about the electric vehicle and a planned route or the route already traveled. Should the driver use too much of the available supply of electric energy for comfort functions, the driver will receive information in this regard so that he can reduce his comfort requirements to the extent necessary in order to reach a certain destination.

DE 10 2012 018 290 discloses an operating device for a motor vehicle by means of which different motor vehicle functions can be activated at the same time with an automatic mode.

SUMMARY OF THE DISCLOSURE

The object of the present invention is to provide a solution by means of which a driver of a motor vehicle is better supported to reach a desired destination without refueling and/or recharging.

This object is achieved with a method and with a system for operating a motor vehicle having the independent patent claims. Advantageous embodiments with convenient and non-trivial further developments of the invention are described in the dependent claims.

The method according to the invention for operating a motor vehicle comprises the following steps:
  detecting a destination specified by a vehicle occupant;
  determining which residual range of the motor vehicle is indicated at the destination;
  if the determined residual range is smaller than the predetermined threshold value: operating the motor vehicle in a consumption optimizing mode in which the motor vehicle is operated with automatic carrying out of measures for lowering the consumption of the motor vehicle until the destination is reached, wherein
  each of the measures is continuously evaluated with respect to its influence on the reduction of fuel consumption achievable in this manner,
  each of the measures is continuously evaluated with respect to its influence on restricting a driver of a motor vehicle,
  the individual measures are activated and deactivated depending on their respective continuously determined influences on the lowering of consumption and on restriction imposed on the driver until the destination is reached in such a manner that destination is reached with a residual range that at least corresponds to the threshold value and that minimizes the limitation of the driver that is due to the measures.

The input of the destination can be performed for example with a navigation device on the side of the motor vehicle, wherein the energy required for the vehicle to achieve the destination is calculated according to the input destination. This energy amount can be based for example on recent consumption data of the motor vehicle and/or it can take into account the characteristics of physical models. If the motor vehicle is a purely electric vehicle, this determined energy amount is compared to the actual battery charge of the motor vehicle. If the motor vehicle is a motor vehicle that has a pure internal combustion engine drive, the determined energy amount is compared to the still available fuel amount in the tank of the motor vehicle. If the motor vehicle is a hybrid motor vehicle, the calculated energy amount is compared both to the available battery charge and also to the currently still available amount of the fuel in the tank. On the basis of this comparison it is then determined whether the input destination can be reached only barely according to the current calculations, or not at all, wherein the driver is preferably informed about this situation.

It can be provided that the threshold value is predetermined on the side of the motor vehicle so that it cannot be changed. As an alternative, it can be also provided that the threshold value is input manually depending on the preference of the driver. In the latter case, the driver can therefore himself determine which remaining range should still be available when he reaches the destination with his motor vehicle.

According to the invention it is also provided that if the determined remaining range should be less than the predetermined threshold value—which is to say when the input destination is only barely within reach or not reachable at all—the motor vehicle is operated in a consumption-optimizing mode during which the motor vehicle is operated to reach the destination with automatic carrying out of the measures for lowering the consumption of the motor vehicle until the destination is reached. In this case, each of the measures is continuously evaluated with respect to its effect on the reduction in consumption that can be achieved in this manner, wherein each of the measures is additionally also evaluated with respect to its influence on a restriction imposed on the driver of the motor vehicle.

In other words, different measures for lowering the energy consumption measures can be initiated during the consumption-optimizing mode so that the driver can reach his desired destination without refueling and/or recharging of a battery. Different individual measures are continuously activated and deactivated depending on the influence determined on the lowering of consumption and on the restriction imposed on the driver until the destination is reached in such a manner that the motor vehicle will reach the destination with a residual range that at least corresponds to the threshold value, and so that the restriction imposed on the driver by the measures is minimized. With the method described above, the driver himself therefore does not need to take care to ensure a most economical driving manner and/or other measure lowering the consumption of the vehicle until the destination is reached. This reduces the concern of the driver that he will be unable to continue the travel, while the driver is at the same time not restricted in his driving beyond what is necessary. The driver can therefore still reach his destination even with a relatively low fuel level or with a relatively low battery status in as dynamic a manner as possible. At the same time, it can be provided that the consumption optimizing mode will be activated only after a confirmation by the driver.

In a preferred embodiment of the invention, it is provided that several of the following measures are carried out to reduce the fuel consumption until the destination is reached:
    providing warning indications regarding the driving manner of the driver;
    reducing the maximum available output of the motor vehicle;
    reducing the maximum available torque of the motor vehicle,
    limiting the highest achievable speed of the motor vehicle;
    reducing the power consumption of at least one electric consumer of the motor vehicle, such as for example the air conditioning system, an infotainment system, displays, lighting units and the like;
    deactivating a four-wheel drive of the motor vehicle;
    outputting navigation instructions for the direction to the destination provided along a determined route with optimized consumption;
    uncoupling an engine of the motor vehicle from the transmission of the motor vehicle;
    lowering a chassis of the motor vehicle;
    setting a pressure point by means of an active gas pedal of the motor vehicle, which indicates an accelerator position that is not to be exceeded;
    reducing the power consumption of the engine cooling system.

In a further advantageous embodiment of the invention, the evaluation of the measures with respect to their influence on the lowering of consumption achievable in this manner and/or on the restriction imposed on the driver takes place depending on the ambient conditions that are continuously provided for the motor vehicle. It is preferred when at least one of the following variables is provided as an ambient condition:
    the ambient temperature;
    the humidity of air;
    the ambient brightness;
    the type of the road surface;
    the type of the road;
    the curviness of the road;
    the gradient of the street;
    speed limits.

Depending on the ambient conditions, it is preferred when the measures that are used are as much as possible those measure that represent based on given ambient condition a particularly large optimization of the consumption of the motor vehicle, and at the same time represent the smallest possible intervention from the viewpoint of the driver. For example, the reduction of the consumption of power by an air conditioning system of the motor vehicle at relatively low ambient temperatures and a low humidity level can achieve a high level of optimization of consumption of power, while on the other hand, this measure may not be perceived, or is hardly perceived at all by the driver. Or the traffic conditions may be such that it is very unlikely that the driver would engage in dynamic driving, for example because the road is very curvy, or the traffic density is particularly high or the like, so that an intervention in terms of reducing the supplied power and/or the torque of the drive train of the motor vehicle would lead on the one hand to relatively high consumption savings, and on the other hand, this would not be further perceived negatively by the driver.

In a further advantageous embodiment of the invention, a characterizing driver profile is provided for the evaluation of the measures with respect to their influence on the restrictions imposed on the driver as a result of provided measures,. It is possible to use for example continuous data for this purpose, by means of which the driving of the driver can be characterized and quantified. It can be also determined on the basis of a provided driver profile whether the driver is a particularly restrained driver, or whether this is a particularly dynamic driver. Depending on the driver profile, an evaluation can then be made as to which measures can be taken to lower the consumption of the motor vehicle, which measures will not be perceived as bothersome as a function of the type of the driver, or which measures will be perceived as less bothersome by this driver. The evaluation of the measures can be matched individually to the driver and it may be particularly well adapted to the influence of the restriction imposed on the driver.

According to a further preferred embodiment of the invention, the greater the influence of the respective measures on the lowering of consumption achieved in this manner, the more the restrictions on the driver are evaluated and the greater the value of the lowered consumption, so that the more restricting value is assigned to the respective measure and taken into consideration during the activation or deactivation of the measures. In other words, a kind of a measurement system is used on the basis of which on the one hand, the restriction imposed on the driver by respective measures is evaluated, and on the other hand, so is also the potential for lowering consumption. Based on the respective evaluation values and on the restriction values, it can then be determined very accurately which measures are ideal to be adopted to achieve the highest possible level of reduction in fuel consumption, and on the other hand to also impose the fewest restrictions on the driving behavior desired by the driver. For example, respective quotients can be formed from the consumption reduction values and from the restriction values for the respective measures and the corresponding metrics can be established in this manner, which can be mutually compared in order to select the optimal measures resulting in the optimal ratio that can be achieved between the relevant measures and lowering of consumption given the degree of restriction imposed on the driver.

According to another preferred embodiment of the invention, the activation and deactivation of at least one of the measures takes place depending on whether longitudinal guidance of the driver assistance system of the motor vehicle controlling the motor vehicle is activated. In this case, it can be for example a conventional cruise control system or an adaptive cruise control system, which is employed in order to control the speed of the motor vehicle while taking into account the distance to a vehicle ahead as an additional return variable and manipulated variable. It is conceivable that for example the warning indications for the driver regarding the driving style are not issued in this case should cruise control or adaptive cruise control be activated. Alternatively or additionally, it is also possible that by activating cruise control or adaptive cruise control, no pressure point will be activated when the gas pedal is pressed on, which indicates a gas pedal position not to be exceeded. Alternatively or additionally, it is also possible that when cruise control or adaptive cruise control is activated, no cruising operation of the motor vehicle will be carried out as a consumption lowering measure. Further, as an alternative or additionally, it can be also provided that at least with an activated conventional cruise control, the predictive efficiency assistant will not be activated, wherein the driver is required to drive in a particularly economical manner depending on the data describing the route and distance management, speed limits and the like.

According to another preferred embodiment of the invention, the consumption optimizing mode is deactivated as soon as the motor vehicle has reached the destination. The measures that were activated previously in order to reduce the consumption of the motor vehicle therefore do not need to be reset or deactivated manually by the driver.

The system according to the invention for operating a motor vehicle comprises a navigation system for detecting a destination entered by a vehicle's occupant. The system comprises in addition to a control apparatus, which is designed to determine which residual range the motor vehicle will display at the destination and to operate the motor vehicle in a consumption optimizing mode during which the motor vehicle is operated to automatically carry out measures for reducing the consumption of the motor vehicle until the destination is reached if the determined residual range is less than a predetermined threshold value, wherein the control apparatus is designed to continuously evaluate each of the measures undertaken with regard to their influence on the capability to reduce consumption; as well as to continuously evaluate the influence of each of the measures on the restrictions imposed on the driver of the motor vehicle; and to evaluate the individual measures depending on their continuous influence on the lowering of consumption and on the restrictions imposed on the driver until reaching the destination, so as to activate and deactivate them in such a way that the motor vehicle reaches the destination with a residual range that at least corresponds to the threshold value and minimizes the restriction that is imposed on the driver by these measures. Advantageous embodiments of the method according to the invention are to be seen as advantageous embodiments of the system according to the invention, wherein the system in particular comprises steps for carrying out the steps of the method.

The motor vehicle according to the invention comprises the system for operating a motor vehicle according to the invention.

Further advantages, features and details of the invention will become apparent from the following description of preferred embodiments with reference to the figures. The features listed in the description above and combinations of features, as well as the features and combination of features shown in the figure descriptions and/or the features and features combinations shown in the figures alone can be used not only in the respectively specified combinations, but also in other combinations or in isolation without departing from the scope of the invention.

BRIEF DESCRIPTION OF THE DRAWING

Embodiments of the invention will be next explained in more detail based on the schematic illustrations shown in the figures. The figures show the following.

The same or functionally identical elements are labeled with the same reference numerals.

DETAILED DESCRIPTION OF THE DRAWING

Figure 1:
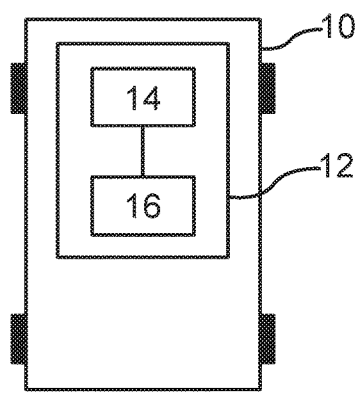
FIG. 1 a schematic representation of a motor vehicle with a system for operating the motor vehicle, which is provided with a navigation device for detecting a destination input by a motor vehicle occupant and a control device for initiating measures for optimization of the consumption of the motor vehicle.

FIG. 1 shows a schematic representation of a motor vehicle 10. The motor vehicle 10 can be for example a purely electric vehicle, a motor vehicle provided with an internal combustion engine, or a hybrid vehicle. The motor vehicle 10 comprises a system 12 for operating the motor vehicle 10, wherein the system 12 is provided with a navigation device 14 and with a control device 16.

The navigation device 14 is used for detecting a destination input by an occupant of the motor vehicle. The control device 16 is designed to determine which residual range will be available to the motor vehicle 10 at the destination. The determination of the residual range can take place for example on the basis of the consumption data registered so far, on the basis of the route guidance until the destination, or it can be based on a stored driver's profile and on different physical models.

The control device 16 is designed to operate the motor vehicle 10 in a consumption optimizing mode in which the motor vehicle is operated to carry out automatically measures for lowering the consumption of the motor vehicle 10 until arriving to the destination if the determined residual range is less than a predetermined threshold value. In other words, the motor vehicle 10 is operated in said consumption optimizing mode if it is detected based on the determined amount of energy required to reach the destination that the necessary energy amount available with the given battery charge and/or with the fuel available in the tank of the motor vehicle the destination is only barely reachable or cannot be reached at all. The driver is preferably informed about this situation. He can then decide to activate the consumption optimizing mode.

The control device 16 is adapted to evaluate each of the measures for lowering the consumption continuously with respect to its influence on the lowering of consumption achievable in this manner and to evaluate each of the measures continuously with respect to their influence on a restriction imposed on the driver of the vehicle 10. The control device 16 is in addition designed to activate and deactivate the individual measures depending on their respective influences being continuously determined on the reduction of consumption and on the restrictions imposed on the driver until the destination is reached in such a way that the motor vehicle 10 reaches the destination with a residual range that at least corresponds to the threshold value and that minimizes the restriction imposed by the measures on the driver.

Figure 2:
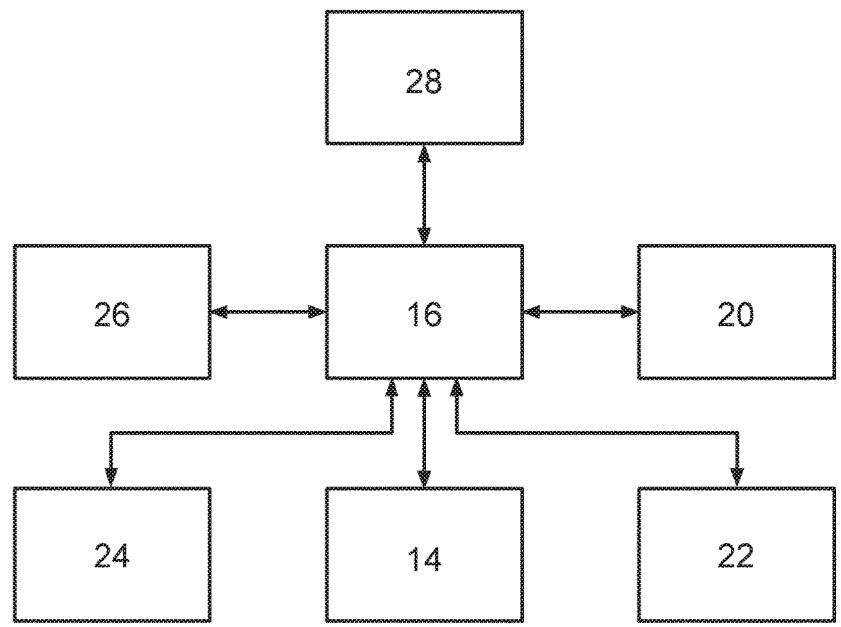
FIG. 2 a schematic representation, in which the navigation device, the control device an another device of the motor vehicle are indicated, wherein the control device is designed to control the different devices of the motor vehicle for initiating consumption reducing measures.

FIG. 2 shows in a schematic representation the control device 16, the navigation device 14, a cruise control 20, an infotainment system 22, an air conditioning system 24, a chassis 26, and an engine 28 of the motor vehicle 10. A method for operating the motor vehicle 10 will be explained in more detail next.

After entering the destination in the navigation device 14, the energy amount required to reach the destination is calculated on the basis of the usage data obtained so far and on the basis of the physical models by the control device 16. This calculated energy amount is compared for example to the battery charge that is still available and/or to the current amount of fuel available in the tank of the motor vehicle 10. If the destination can be reached only barely or not at all, the driver is informed about this. He can now confirm that the consumption optimizing mode needs to be activated by means of the control device 16. A reduction in the consumption of energy by the motor vehicle 10 is now achieved by means of the control device 16 so that the driver can reach his desired destination. In particular, depending on whether the cruise control is or is not activated, different measures are undertaken by the control device 16. The driver thus does not need to worry by himself about possible economical driving methods to be used to reach the destination. This will remove the concern of the driver and he will not be limited only to the bare minimum in his driving style.

When the consumption optimizing mode is activated, numerous measures are employed to reduce the energy consumption of the motor vehicle 10. They include for example: warning regarding the driving style used in order to achieve reduced consumption a reduction of the maximum available power of the motor vehicle 10; a limitation of the achievable torque of the motor vehicle 10; a reduction of the power consumption of at least one electric consumer of the motor vehicle 10 such as for example the air conditioning system 24, the infotainment system 22, displays and lighting device for illumination of the interior of the motor vehicle 10 or also for the headlights. Moreover, for example deactivation of an all-wheel drive of the motor vehicle 10 can be also introduced. Further, navigation instructions can be also issued to follow a route determined for optimized consumption. In addition, it can be also provided that the motor vehicle 10 is partially operated according to a so-called cruising mode in which a decoupling of the engine 28 of the motor vehicle 10 from a transmission of the motor vehicle 10 will take place. If the motor vehicle 10 has an adjustable chassis, a lowering of the chassis of the motor vehicle 10 can be carried out to reduce the air resistance of the motor vehicle 10. If the motor vehicle 10 is equipped with an active accelerator pedal, it can be also provided that a pressure point is installed by means of the accelerator pedal, which indicates an accelerator pedal position that is not to be exceed. In addition, it can be also provided that the power consumption by the engine cooling system of the motor vehicle 10 is reduced. Further, it can be also provided that a predictive efficiency assistant of the motor vehicle 10 is activated, by means of which the driver is required to practice a particularly economical driving style by means of route guidance, cruise control and the like, which is analyzed along the route determined until arriving at the destination.

The cruise control 20 may be a conventional cruise control that simply maintains a set speed of the motor vehicle 10. As an alternative, the cruise control 20 can be also a so-called adaptive cruise control. When the cruise control 20 is not activated, the driver is signaled with a pressure point of the active accelerator pedal—as long as the motor vehicle is equipped with such an accelerator pedal—what is the recommended accelerator pedal position. In the table below are listed examples of different measures that can be used for lowering the consumption of the motor vehicle 10, wherein it is indicated by an "x" sign for each measure which measure depends on whether the driver is driving himself, or whether a conventional cruise control or an adaptive cruise control is activated.

| Measure | Driver drives himself | Driver drives with a conventional cruise control | Driver drives with an adaptive cruise control |
| --- | --- | --- | --- |
| Warnings | x | | |
| Pressure point accelerator pedal active | x | | |
| Cruise control operation | x | | |
| Activate predictive efficiency assistant activated | x | | x |
| Reduction of power and/or of the torque of the engine | x | x | x |
| Restriction imposed on top speed | x | x | x |

| Measure | Driver drives himself | Driver drives with a conventional cruise control | Driver drives with adaptive cruise control |
| --- | --- | --- | --- |
| Reduced power available to the air conditioning system | x | x | x |
| Reduced power available to the infotainment system | x | x | |
| Deactivate all-wheel drive | x | x | x |

| | | | |
|---|---|---|---|
| Determine route optimized for consumption | x | x | x |
| Lower the chassis | x | x | x |
| Reduce the power available to the engine cooling system | x | x | x |

The activation of the different measures employed to reduce the consumption of the motor vehicle 10 is carried out in a plurality of escalating steps. The influence of the individual measures on the reduction of consumption by the motor vehicle 10 is continuously dynamically calculated and evaluated while taking into account the impact on the driver.

In other words, each of the measures is continuously evaluated with respect to its influence on the lowering of the consumption that can be achieved in this manner. In addition, each measure is also continuously evaluated with respect to its impact on the restriction imposed on the driver of the motor vehicle 10. The individual measures are activated and deactivated depending on their respective continuous influences on the lowering of consumption and on the restriction imposed on the driver until the destination is reached in such a manner that the motor vehicle 10 reaches the destination with a residual range which at least corresponds to the threshold value, so that the restriction imposed on the driver by the measures is minimized.

The evaluation of the measures with respect to their impact and to the reduction of the consumption of the vehicle 10 that can be achieved in this manner takes place as a function of ambient conditions continuously provided for the vehicle 10. As ambient conditions can be considered for example the ambient temperature, humidity, ambient brightness, road conditions, the type of the road, the curviness of the road, the gradient of the street or any speed limits along the route until the destination is reached. In addition, the evaluation of the measures with respect to their influence on the restriction imposed on the driver may take place as a function of the driver's profile characterizing the behavior of the driver.

The greater the impact of the different respective measures on the reduction of consumption that can be achieved in this manner and on the restriction imposed on the driver, the greater also the value of value that is assigned to the reduction of the consumption, and the greater the value of the assigned restriction that is taken into account during the activation or deactivation of the measures. This means that the different measures are activated or deactivated along the route until the destination in such a manner that the destination can be reached with the current battery charge and/or with the current amount of fuel in the tank of the motor vehicle 10, while on the other hand, the driver can continue his usual driving style while being restricted only very little by the restrictions that are actually imposed. The driver of the motor vehicle 10 can therefore still reach his destination even with his usual driving style even when the consumption optimizing mode is activated at a relatively low fuel tank level and/or battery charge status as dynamically as possible. The consumption optimizing mode is deactivated as soon the motor vehicle 10 has reached the destination. The measures that were previously activated for reduction of the consumption thus do not need to be deactivated again manually by the driver when he wants to continue driving further the motor vehicle 10.

The invention claimed is:

1. A method for operating a motor vehicle, comprising:
    detecting a destination input by a vehicle occupant;
    determining a residual range of the motor vehicle indicated at the destination;
    if the determined residual range is smaller than a predetermined threshold value: operating the motor vehicle in a consumption optimizing mode in which the motor vehicle is operated with automatic carrying out of measures for lowering the consumption of the motor vehicle until the destination is reached, wherein
    each of the measures is continuously evaluated with respect to an influence on the reduction of fuel consumption achievable,
    each of the measures is continuously evaluated with respect to an influence on a restriction imposed on a driver of the motor vehicle, and
    each of the measures are activated and deactivated depending on their respective continuously determined influences on the lowering of consumption and on the restriction imposed on the driver until the destination is reached such that the residual range at least corresponds to the threshold value and the restriction imposed on the driver that is due to the measures is minimized.

2. The method according to claim 1, wherein a plurality of measures for reducing consumption are carried out until reaching the destination, the plurality of measures comprising:
    providing warning indications regarding a driving style of the driver;
    reducing a maximum available output of the motor vehicle;
    reducing a maximum available torque of the motor vehicle,
    limiting a highest achievable speed of the motor vehicle;
    reducing a power consumption of at least one electric consumer of the motor vehicle;
    deactivating a four-wheel drive of the motor vehicle;
    outputting navigation instructions for a direction to the destination along a determined route with optimized consumption;
    uncoupling an engine of the motor vehicle from a transmission of the motor vehicle;
    lowering a chassis of the motor vehicle;
    setting a pressure point by means of an active gas pedal of the motor vehicle which signals an accelerator position that is not to be exceeded; and
    reducing the power consumption of the engine cooling system.

3. The method according to claim 1, wherein an evaluation of each of the measures with respect to their influence on the reduction of consumption that can be achieved and on the restriction imposed on the driver takes place as a function of continuously provided ambient conditions of the motor vehicle.

4. The method according to claim 3, wherein at least one of the following variables is provided among ambient conditions:
    ambient temperature;
    humidity of air;
    ambient brightness;
    type of the road surface;
    type of the road;
    curviness of the road;
    gradient of the street; and
    speed limits.

5. The method according to claim 1, wherein an evaluation of each of the measures with respect to their influence on the restriction imposed on the driver takes place as a function of a provided driver's profile characterizing the behavior of the driver.

6. The method according to claim 3, wherein the greater an evaluated influence of each of the respective measures on the reduction of consumption that can be achieved and on the restriction imposed on the driver, the greater a consumption reduction value and the greater a value that is taken into account for a restriction imposed by each measure that is assigned during an activation and deactivation of each measure.

7. The method according to claim 1, wherein an activation and deactivation of at least one of the measures takes place depending on whether a longitudinal guidance of the motor vehicle controlling the driver assistance system is activated.

8. The method according to claim 1, wherein the consumption optimizing mode is deactivated as soon as the motor vehicle reaches the destination.

9. A system for operating a motor vehicle, comprising:
a navigation device for detecting a destination input by a motor vehicle occupant;
a control device which is adapted to determine which residual range of the motor vehicle will be indicated at the destination, and to operate the motor vehicle in a consumption optimizing mode, during which the motor vehicle is operated to carry out automatic measures for reducing a consumption of the motor vehicle until reaching the destination, wherein if the determined residual range is less than a predetermined threshold value, the control device is adapted to continuously evaluate each of the measures with respect to the influence that can be achieved on a reduction of consumption; wherein the control device is designed in order to continuously evaluate each of the measures with respect to an influence on a restriction imposed on the driver of the motor vehicle;

evaluate the measures depending on continuously determined influences on the reduction of the consumption and on the restriction imposed on the driver until reaching the destination and to activate and deactivate the measures in such a manner that that motor vehicle reaches the destination with a residual range which corresponds at least to the threshold value and which minimizes the restriction imposed on the driver.

* * * * *